US009778999B2

(12) United States Patent
Martin et al.

(10) Patent No.: US 9,778,999 B2
(45) Date of Patent: *Oct. 3, 2017

(54) ADAPTIVE PRIVATE NETWORK WITH GEOGRAPHICALLY REDUNDANT NETWORK CONTROL NODES

(71) Applicant: Talari Networks Incorporated, Cupertino, CA (US)

(72) Inventors: Todd Martin, Cary, NC (US); Wei Huang, Cary, NC (US); Stephen Craig Connors, Jr., Raleigh, NC (US)

(73) Assignee: TALARI NETWORKS INCORPORATED, San Jose, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/721,337

(22) Filed: May 26, 2015

(65) Prior Publication Data

US 2015/0254146 A1 Sep. 10, 2015

Related U.S. Application Data

(63) Continuation of application No. 13/719,433, filed on Dec. 19, 2012, now Pat. No. 9,069,727.

(51) Int. Cl.
*G06F 11/00* (2006.01)
*G06F 11/20* (2006.01)
(Continued)

(52) U.S. Cl.
CPC ...... *G06F 11/2002* (2013.01); *G06F 11/0709* (2013.01); *G06F 11/1464* (2013.01);
(Continued)

(58) Field of Classification Search
CPC ............ G06F 11/0709; G06F 11/1464; G06F 11/2002; G06F 11/2005; G06F 11/07;
(Continued)

(56) References Cited

U.S. PATENT DOCUMENTS

2007/0195692 A1* 8/2007 Hagglund ........... G06F 11/2058
370/216
2008/0243866 A1* 10/2008 Pandey ............. G06F 17/30067
(Continued)

*Primary Examiner* — Joseph D Manoskey
(74) *Attorney, Agent, or Firm* — Hultquist, PLLC; Peter H. Priest

(57) ABSTRACT

Systems and techniques are described which improve performance, reliability, and predictability of networks. Geographically diverse network control nodes (NCNs) are provided in an adaptive private network (APN) to provide backup NCN operations in the event of a failure. A primary NCN node in a first geographic location is operated according to a primary state machine at an NCN active state. A client node is operated according to a client state machine. A secondary NCN node in a second geographic location that is geographically remote from the first geographic location is operated according to a secondary state machine at a standby state. The three state machines operating parallel and upon detecting a change in APN state information, the secondary state machine transitions from the standby state to a secondary active NCN state and the secondary NCN node provides APN timing calibration and control to the client node.

20 Claims, 13 Drawing Sheets

(51) Int. Cl.
*G06F 11/14* (2006.01)
*G06F 11/07* (2006.01)
*H04L 12/805* (2013.01)
*H04L 12/24* (2006.01)
*H04L 29/08* (2006.01)
*H04L 12/751* (2013.01)
*H04L 12/721* (2013.01)
*H04L 29/06* (2006.01)
*H04L 12/26* (2006.01)
*H04W 84/12* (2009.01)

(52) U.S. Cl.
CPC ...... *G06F 11/2005* (2013.01); *H04L 41/0659* (2013.01); *H04L 41/12* (2013.01); *H04L 45/10* (2013.01); *H04L 45/40* (2013.01); *H04L 47/365* (2013.01); *H04L 67/12* (2013.01); *G06F 2201/86* (2013.01); *H04L 43/0858* (2013.01); *H04L 69/28* (2013.01); *H04W 84/12* (2013.01)

(58) Field of Classification Search
CPC .. G06F 11/0757; G06F 11/14; G06F 11/1456; G06F 11/20; G06F 11/3006; G06F 2201/86; H04L 45/40; H04L 41/0659; H04L 45/10; H04L 47/365; H04L 67/12; H04L 43/0858; H04L 69/28; H04W 84/12
USPC ... 714/4.11, 4.1, 4.21, 25, 47.1, 47.2, 48, 42
See application file for complete search history.

(56) References Cited

U.S. PATENT DOCUMENTS

| | | | |
|---|---|---|---|
| 2009/0310485 A1* | 12/2009 | Averi | H04L 45/00 370/232 |
| 2012/0159235 A1* | 6/2012 | Suganthi | G06F 11/2028 714/4.11 |
| 2012/0266015 A1* | 10/2012 | Taylor | H04L 12/5601 714/4.11 |
| 2012/0284557 A1* | 11/2012 | Shen | G06F 11/1438 714/4.11 |

* cited by examiner

ADAPTIVE PRIVATE NETWORK WITH GEOGRAPHICALLY REDUNDANT NETWORK CONTROL NODES

This application is a continuation of U.S. patent application Ser. No. 13/719,433 entitled "An Adaptive Private Network with Geographically Redundant Network Control Nodes" which was filed on Dec. 19, 2012 and is incorporated by reference herein in its entirety.

CROSS REFERENCE TO RELATED APPLICATION

U.S. Pat. No. 8,125,907 filed on Jun. 11, 2009 entitled "Flow-Based Adaptive Private Network with Multiple WAN-Paths and U.S. patent application Ser. No. 13/208,825 filed on Aug. 12, 2011 entitled "Adaptive Private Network Asynchronous Distributed Shared Memory Services" have the same assignee as the present application, are related applications, and are hereby incorporated by reference in their entirety.

FIELD OF THE INVENTION

The present invention relates generally to improved network communication. More specifically, the present invention relates to providing redundancy for a network control node (NCN) site by allowing a second site to serve as the NCN if the primary site becomes unavailable.

BACKGROUND OF THE INVENTION

The introduction of frame relay in the early 1990's brought lower cost, higher bandwidth, improved reliability, and simpler management control to enterprise wide area networks (WANs) as compared to X.25 and point-to-point leased-line alternatives. Frame relay, together with single-source asynchronous transfer mode (ATM) and multiprotocol label switching (MPLS) services, still dominate the enterprise WAN market for corporate Internet traffic. A customer installs one of these networks and pays a single carrier a fee associated with the reliability and bandwidth the particular network provides. For example, a network may be advertised to provide "3 and ½ nines" (99.95%) or better reliability and have a fee based on this reliability and a cost per mega-bytes-per-second (Mbps). The present cost for such a network is almost as high as the fee paid back in 1998.

Applications such as Voice over IP (VoIP) have also become more pervasive and demand higher levels of Quality of Service (QoS) when run over the Internet. The quality of a call as well as reliability of the call duration have a clear expectation from the end users. While the deployment of VoIP over the Internet for making calls is new, the application of making a phone call over the Public Switched Telephone Network (PSTN) is not and users can easily detect poor call quality and a dropped call.

While performance, reliability, and predictability of a network have improved due to improvements in processor and communication architectures and implementations, these characteristics of a single network purchased from a single network provider are considered relatively low in performance, quality and are costly. Also, load balancing is still a difficult process due to the dynamic nature of networks.

SUMMARY OF THE INVENTION

Among its several aspects, the present invention addresses systems and techniques which improve performance, reliability, and predictability of networks without having costly hardware upgrades or replacement of existing network equipment. To such ends, an embodiment of the invention addresses a method to provide geographically diverse network control nodes (NCNs) in an adaptive private network (APN). A primary NCN node in a first geographic location is operated according to a primary state machine at an NCN active state. A client node is operated according to a client state machine. A secondary NCN node in a second geographic location that is geographically remote from the first geographic location is operated according to a secondary state machine at a standby state, wherein upon detecting a change in APN state information, the secondary state machine transitions from the standby state to a secondary active NCN state and the secondary NCN node provides APN timing calibration and control to the client node.

Another embodiment addresses a method to provide geographically diverse network control nodes (NCNs) in an adaptive private network (APN). A primary NCN node in a first geographic location is operated according to a primary state machine at an NCN active state. In parallel, a first client node is operated according to a first client state machine at a first client primary active state and a second client node is operated according to a second client state machine at a second client primary active state. A secondary NCN node in a second geographic location that is geographically remote from the first geographic location is operated according to a secondary state machine at a standby state, wherein upon detecting a change in APN state information, the primary node provides APN timing calibration and control to the first client node and the secondary NCN node transitions to an active NCN providing APN timing calibration and control to the second client node.

Another embodiment addresses a method to provide geographically diverse network control nodes (NCNs) in an adaptive private network (APN). A primary NCN node in a first geographic location is operated according to a primary state machine at an NCN active state. In parallel a first client node is operated according to a first client state machine at a first client primary active state and a second client node is operated according to a second client state machine at a second client primary active state. A secondary NCN node in a second geographic location that is geographically remote from the first geographic location is operated according to a secondary state machine at a standby state, wherein the first client node is coupled by a first conduit to the primary NCN node and by a second conduit to the secondary NCN node, the second client node is coupled by a third conduit to the primary NCN node and by a fourth conduit to the secondary NCN node, and the primary NCN node is coupled by a fifth conduit to the secondary NCN node and wherein upon detecting a change in operating state for one or more of the conduits coupled to the primary NCN node, the secondary NCN node transitions to an active NCN state.

Another embodiment addresses a computer readable non-transitory medium storing a computer program which causes a computer system to perform a method to provide geographically diverse network control nodes (NCNs) in an adaptive private network (APN). A primary NCN node in a first geographic location is operated according to a primary state machine at an NCN active state. A client node is operated according to a client state machine. A secondary NCN node in a second geographic location that is geographically remote from the first geographic location is operated according to a secondary state machine at a standby state, wherein upon detecting a change in APN state information, the secondary state machine transitions from the standby state to a secondary active NCN state and the secondary NCN node provides APN timing calibration and control to the client node.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

The present invention is directed towards providing a flow-based, reliable, high-bandwidth network comprised of multiple paths between sites.

Figure 1:
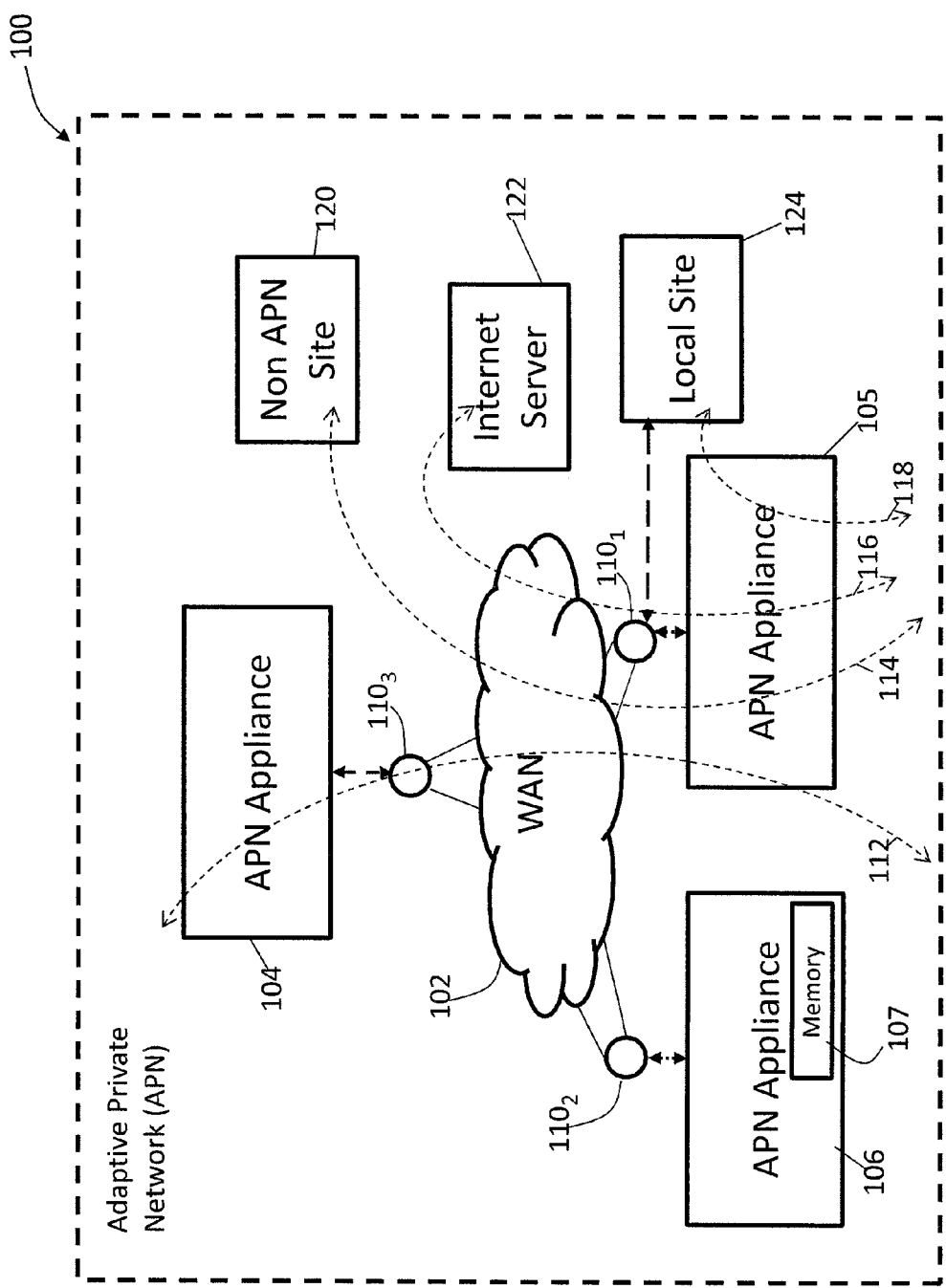
FIG. 1 illustrates an adaptive private network (APN) with APN network service paths in accordance with the present invention.

FIG. 1 shows an example of an adaptive private network (APN) 100 in which the present invention may be suitably employed as described in further detail below, including the network components, flows, paths, and services. The APN 100 includes one or more wide area networks (WANs), such as WAN 102, APN appliances 104-106, WAN routers $110_1$-$110_3$, and network application services as well as APN conduits between APN appliances, as described in more detail below.

An APN path is a logical connection established between two WAN links located at different geographic sites across a WAN.

An APN conduit is a virtual connection between two APN nodes, formed by aggregating one or more APN paths and their allocated WAN link resources.

An APN appliance (APNA) is a device that contains APN node functionality including all software modules within.

A WAN link represents a physical access point to the wide area network (WAN), such as a digital subscriber line (DSL) connection or a cable modem. The distinctive characteristic of a WAN link is the bandwidth, or in other words, the amount of data capacity available for transmission and reception. WAN links can be shared among APN conduits, and intranet and Internet network services. In the present embodiments, the APN appliances do not directly attach to WAN links. APN appliances communicate with WAN links through logical connections, such as the WAN routers $110_1$-$110_3$ of FIG. 1.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

An APN service is a set of processing steps performed on packets that are transmitted through the APN. As illustrated in FIG. 1, data traffic that moves through APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN node may have multiple APN conduits that connect to remote APN nodes. For each APN conduit there exists a separate APN service instance for the APN conduit service type.

An APN conduit service associated with path 112 manages network traffic packets that are transmitted through the APN 100 from the APN appliance 105 through router $110_1$, through the WAN 102, through another router $110_3$ to APN appliance 104. The APN conduit service for path 112 operates on both APN appliances 104 and 105. The APN conduit service sends and receives data between a first geographic location that has an APN appliance 105 and a different geographic location that has an APN appliance 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APN appliance 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has an APN appliance 105 and a local site 124 within the same first geographic location. In another embodiment, an APN pass through service may be used to send and receive data between a first geographic location that has the APN appliance 105 and different geographic location within an enterprise network that does not have an APN appliance and does not traverse the WAN using any WAN links associated with any other APN services.

Figure 2A:
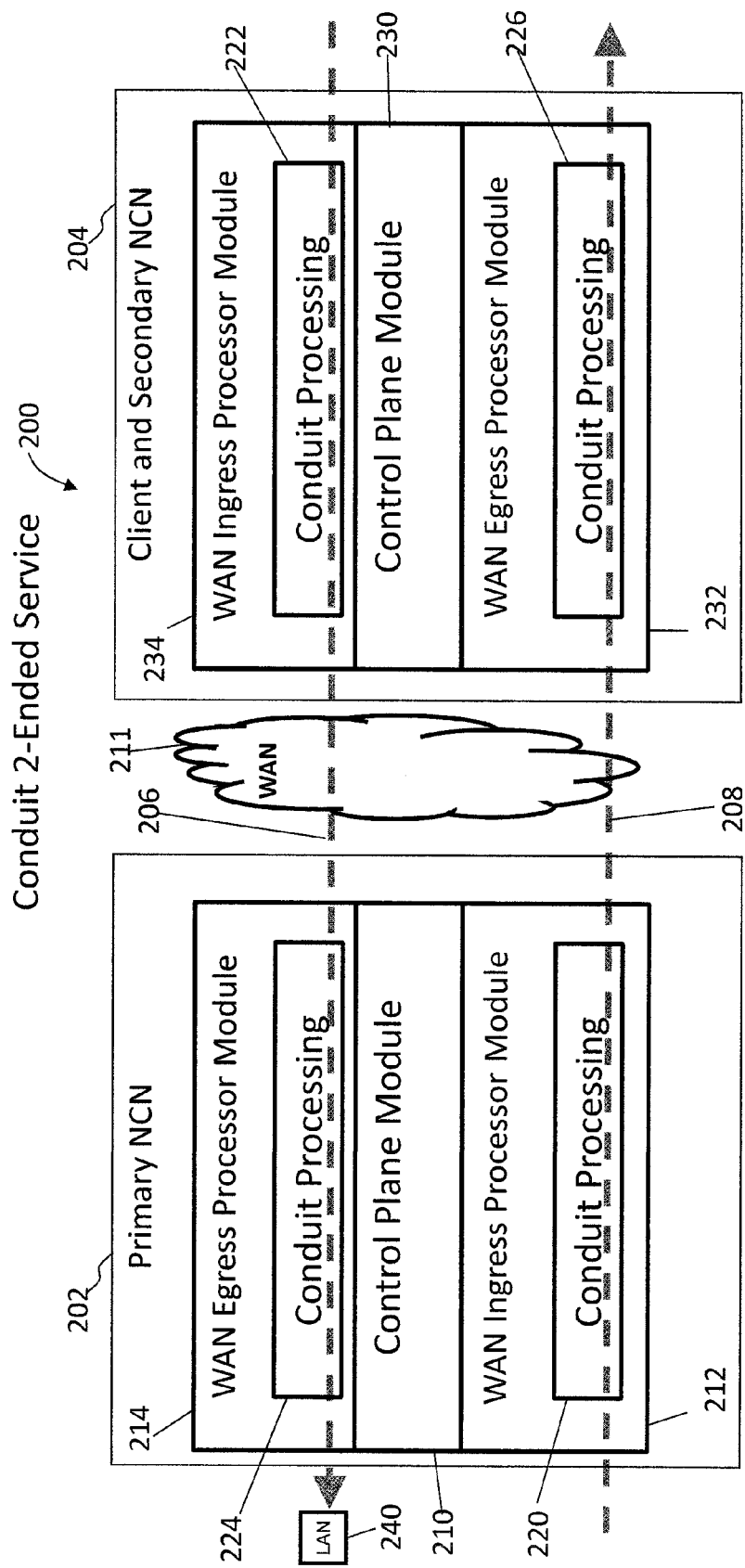
FIG. 2A illustrates an APN conduit service between a control node and a client node in accordance with the present invention.
Figure 2B:
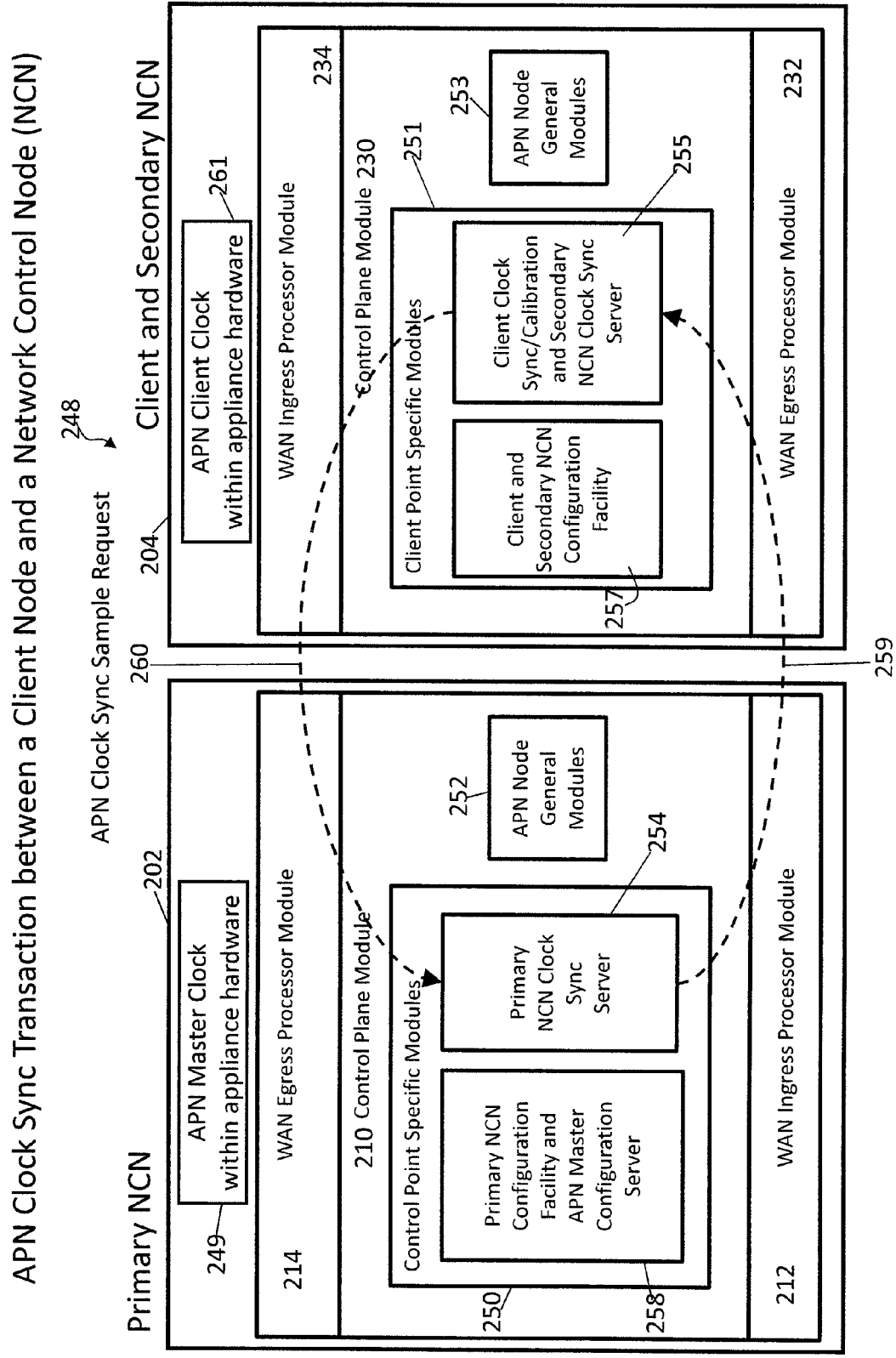
FIG. 2B illustrates an APN time synchronization transaction between an APN client node and an APN control node in accordance with the present invention.
Figure 2C:
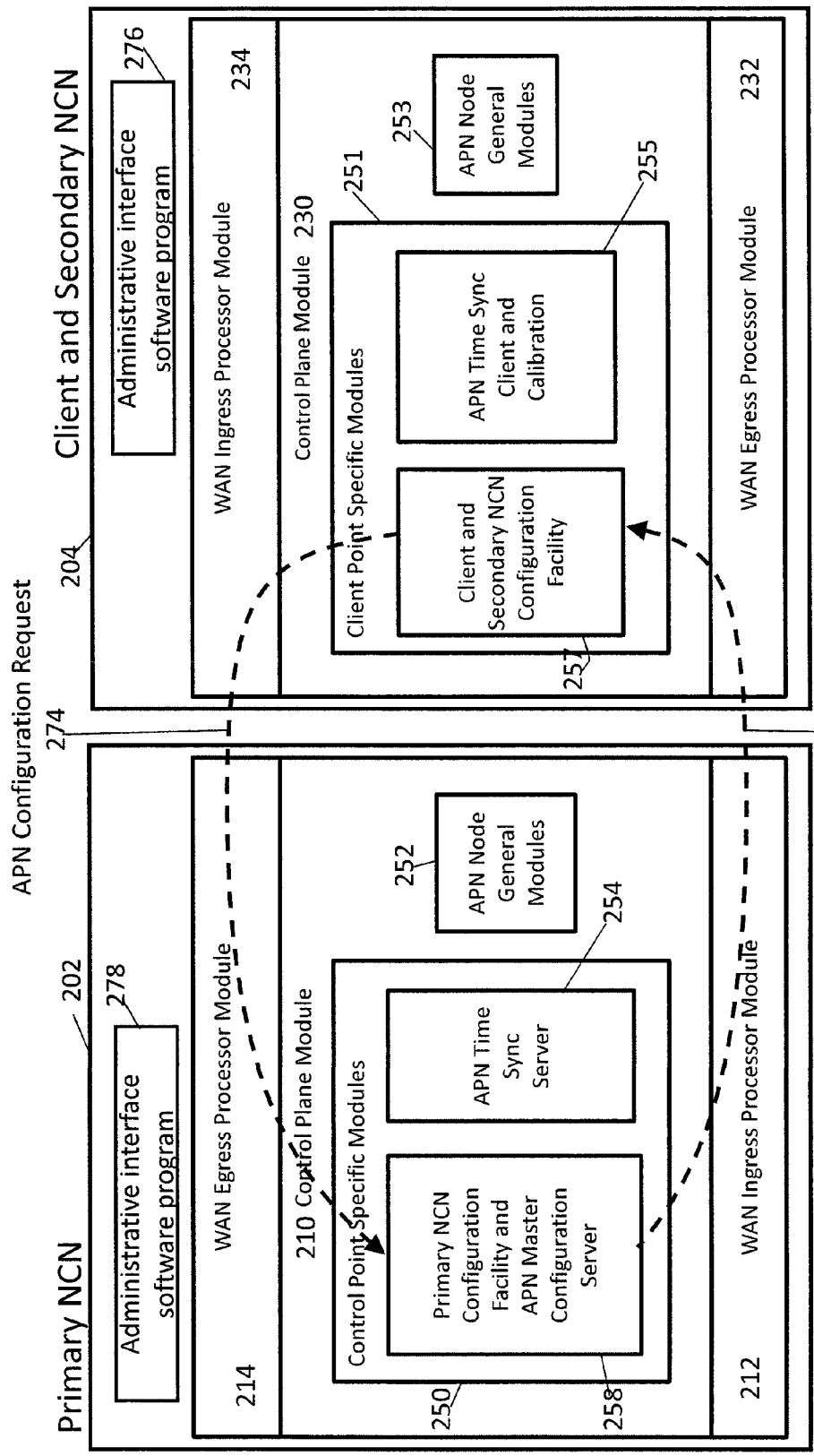
FIG. 2C illustrates an APN configuration transaction between an APN client node and an APN control node in accordance with the present invention.

FIG. 2A illustrates an APN conduit 2-ended service 200 between a primary NCN control node 202 and a client and secondary NCN 204 according to the present invention. In the description of FIGS. 2A-2C, the client and secondary NCN 204 is configured to operate as a client node. The client and secondary NCN 204 may also be configured for an alternative operation as a secondary NCN is described in further detail below. Each APN node contains a collection of software modules which govern its participation within an APN. The software modules for the control node 202 and the client and secondary NCN 204 include control plane modules 210 and 230, WAN ingress processor modules 212 and 234, and WAN egress processor modules 214 and 232, respectively. As illustrated in FIG. 2A, the WAN ingress processing modules 212 and 234 includes conduit services 220 and 222, and WAN egress processing modules 214 and 232 includes a duplicate conduit service 224 and 226. Intranet service, Internet service, and pass through service are also provided at each APN node. Each APN service type, including conduit, intranet, Internet, and pass through service types, implements processes for each type of data traffic that is communicated to and from the WAN respectively.

As illustrated in FIG. 2A, APN conduit traffic, identified by bold dashed arrow path 206 and 208, flows through two APN nodes 202 and 204 as the traffic traverses the APN. WAN ingress processing module 234 of APN client and secondary NCN 204 performs the WAN ingress conduit service processing 222 prior to transmitting the traffic 206 via the WAN 211 to the APN control node 202. WAN egress processor module 214 of the APN control node 202 performs the WAN egress conduit service processing 224 prior to transmitting the traffic 206 to the node or nodes located on LAN 240. The binding of the one APN node's WAN ingress conduit processing 222 to the peer APN node's WAN egress conduit service processing 224 constitutes an APN conduit in which traffic is actively monitored and managed across multiple WAN resources.

The APN is capable of using disparate asymmetric WAN links which vary in behavior of bandwidth, latency, jitter, packet loss and congestion frequently over time. For example, the APN can use an asymmetric DSL WAN link that transmits data at 512 kbps upstream to the WAN and 6 mbps from the WAN through the public network combined with a private symmetric leased circuit T1 WAN link that transmits data at 1544 kbps upstream and downstream and a cable broadband connection that transmits data at 312 kbps upstream to the WAN and 3 mbps from the WAN to a peer having adequate aggregation bandwidth of these rates for a single TCP file transfer session at a theoretical transmit rate of 2368 kbps and receive at 10544 kbps. Practically, under good network behavior the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In a presently preferred embodiment, the APN node's software modules at a site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as a personal computer, a server, or the like having one or more central processing unit devices. The processor and memory complex, for example, may be configured to execute instructions under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM) memory, flash memory, ROM memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN node) contains software modules required to participate in an adaptive private network. An APN node may exist in one or more APN appliances at a location. An APN node contains a collection of software modules which govern its participation within an APN such as in FIG. 2A control plane modules 210 and 230, WAN ingress processor modules 212 and 234, and WAN egress processor modules 214 and 232. The control plane module is responsible for controlling and participating in the control of the APN node in tandem with other APN nodes in the network.

The WAN ingress processor module 212 may suitably be embodied as software and hardware components responsible for processing network traffic for transmission from a local area network (LAN) to a WAN. The WAN egress processor module 214 may suitably be embodied as software operating on hardware components, such as a processor and memory complex that is responsible for processing network traffic for transmission from a WAN to a LAN. WAN ingress and WAN egress processor modules are discussed in further detail below. The APN node's control plane module 210 may suitably be embodied as software operating on hardware components, such as a processor and memory complex that utilizes the APN node's WAN ingress processor module 212 and WAN egress processor module 214 as the means for transmitting and receiving APN node to APN node control data across the WAN.

FIG. 2B illustrates an APN time synchronization transaction 248 between an APN client and secondary NCN 204 and an APN control node 202 according to the present invention. If a secondary NCN becomes the active NCN due to a failure at the primary NCN site or a failure of the conduit between the primary NCN and secondary NCN, the APN is recalibrated to the master clock in the secondary NCN. As seen in FIG. 2B, a network control node (NCN) module 250 is an administration point for an APN. In one embodiment, the NCN module 250 resides within the APN control node 202. The APN control node 202 represents an APN node that also performs as the network control point of the APN. In another embodiment, an NCN module, such as NCN module 250, resides in an appliance that is separate from an APN node and administers and controls the APN nodes within the APN. The NCN module 250 provides administrative support and control to the APN, including but not limited to, distribution of configuration objects to APN client nodes and time synchronization to the APN. In another embodiment, multiple NCNs are provided for redundancy purposes to avoid having a single point of failure in an APN.

The APN client and secondary NCN 204 is an APN node that can perform as a client node and the secondary APN NCN control point. It performs as an APN client point that works in tandem with an external APN control point for the APN node's control and administration or as the APN node's control point when the primary NCN 202 fails.

One purpose of the APN control point is to establish and manage APN conduits between APN nodes across a WAN for intra-enterprise site-to-site communications. A particular APN control node may administer and have conduits to multiple APN client nodes. Typically, an APN control node is located in the data center of an enterprise. In such an embodiment, the APN control node administers conduits to and from the data center. In another embodiment, the APN control node may also administer conduits directly from APN client node to APN client node.

An APN client node is an APN node that exists remote from an APN control point. Although an NCN will potentially have multiple APN network client nodes, each APN network client node will preferably have one active NCN. In one embodiment, APN client nodes will have practically no need for local administration. Generally, APN client nodes will be located at remote branch offices.

The synchronization of control information from the single APN control point of an APN to one or more APN client points is one aspect of maintaining the proper behavior of the APN in general. An APN clock and APN configuration synchronization transactions between APN control points and APN client points are transactions discussed immediately below in greater detail.

As illustrated in FIG. 2B, a master APN clock 249 is synchronized throughout all APN client nodes, such as client and secondary NCN 204, within an APN. An APN clock sync server 254 synchronizes timing throughout APN nodes, such as APN client and secondary NCN 204, in the APN. A hardware real time clock is contained within an APN appliance of the APN control node 202, such as appliance 104 shown in FIG. 1. This clock is used as an APN reference clock for the APN and is referred to as the master APN clock. Each APN client point solicits and calibrates to the APN clock sync server 254, residing within the APN control point specific NCN module 250, on an APN control node 202. Each APN client node, such as APN client and secondary NCN 204, also contains a hardware real time clock 261 within the client and secondary NCN 204's APN appliance, such as appliance 105 shown in FIG. 1. This APN client clock 261 is referred to as the APN client clock. Preferably, the time synchronization is such that drift between the APN nodes, for example, is limited to a drift of about a few milliseconds. In a presently preferred embodiment, empirical study validates that the drift range is about 1.5 milliseconds.

The master high resolution APN master clock 249 is kept at the APN control point and each APN client point synchronizes to this clock. Each APN client node, such as client and secondary NCN 204, sends an APN clock sync sample request message 260 to the APN control node 202 to request the current time. The request message 260 is received in the APN control node and initiates a process that responds to the request message 260 by sending the current time back to the APN client node in an APN time sync sample reply message 259. The APN client node measures the time from initiating the request, T0, to receiving the current time response, T1. An assumption is made that the travel time to send the request message 260 to the APN control node is approximately the same as the travel time for the APN control node to send the current time reply message 259 to the APN client node. Based upon this assumption, the time difference of T1-T0 is then divided by two.

The APN client node uses this timing data to adjust a network time by using a linear algebraic calculation based on the slope-intercept form. In a current implementation, y is the time at the APN control node and x is the client node local time, b is the base offset between the two, and m is the rate of change of y versus x which is the slope. Using these definitions, an equation in slope-intercept form y=mx+b is expressed as network time=slope*client local time+base.

The slope is calculated by taking two samples over a pre-specified period and averaging the samples together. The base offset is calculated by taking the difference of the value between the network control point time and the client time, adjusted for one half round trip time (RTT).

In order to limit jitter and phase shift error, a table of time synchronization samples is kept. These tables, called time sync sample tables, are defined below. Finite impulse response filter tables for slope and base are kept as well.

In a current implementation, a table containing 128 entries is used to track time sync samples. Each time sync sample has two fields per record; the APN network time from the network control point, and the local time plus one-half RTT. With the first time sync sample, every entry in the time sync sample table is initialized with the value of the first sample of APN time and local time. Each subsequent sample entry is advanced in the table eventually rotating through all entries circularly.

The time sync sample table is then used to derive a slope sample by dividing the time deltas of the current entry in the time sync table and the oldest entry in the rotating table for the APN network time and the local time. The slope sample is equal to the change in APN network time divided by change in APN client local time for the duration of the table, which is the time between the current and the oldest entry in the table. Note that this time sync table itself is not a finite impulse table, since an average sum for a sum of all the elements in the table is not used, but rather a slope between two points in time that are 126 sample entries apart is utilized. It will be recognized that different numbers of table entries and spacings may be employed, and that the example described is illustrative and not limiting.

A finite impulse response table for slope contains 64 entries. Initially, every entry in this slope table is initialized to one, meaning the rate of change of the APN network time is defaulted to the rate of change as the local time.

As slope samples are derived from the time sync sample table, actual slope entries displace the defaulted slope entries. Similar to the sample table, the slope table is a circular table where each entry advances. Each subsequent sample entry is advanced in the table eventually rotating through all entries circularly. A sum of all the slopes in the slope table is maintained using all the entries in the slope table. Each time a new entry is added, the sum is recalculated by subtracting the value of the entry removed and adding the value of the new entry.

A base sample table contains 256 entries. This table is not actually used to determine the base that will be used for APN time, but instead is used to determine the acceptability of the last time sync sample to be used for resetting the base and slope.

Each entry in the base sample table contains two fields, a value field and a period field. The value field contains a difference between the value of local time plus one-half RTT in local time and the value of APN network time. Additionally, the period field contains the time period duration between this sample time and the prior time sync sample time. This results in a table that has a time span that covers the time from the first entry to the last entry. A sum is continually calculated on both the value and period fields for all entries in the table.

Once samples have been run for a period greater than 200 milliseconds between the first entry in the base table and the last entry in the base table, the software then begins to use the base table to determine acceptability filters. The sum of the value fields in the base table is divided by the sum of the period fields in the table. This value is the average rate of change of the base for the base table over the time period. In a current implementation, this value is adjusted for change per second.

The base offset in APN clock sync client and calibration module 255 is not acceptable for adjustment if each of the following is true:
1. If the absolute rate of change of the last sample is greater than the absolute value of the average rate of change for the base table plus or minus three times the square root of that rate of change.
2. If the period covered by the base table is greater than 1 second.
3. If the time since the last acceptable sample is less than 2 seconds.
4. If more than four unacceptable samples have not been received in a row, where an unacceptable sample is described in 1 above with four chosen as indicative of a pattern rather than an anomaly.

If the value is rejected but it is determined, that the rate of change is fluctuating from positive slope to negative slope, an unacceptable counter is cleared and the last good time is set to present. If the value is not rejected by the filter, then the slope and base may be updated.

The formula for updating the slope is the sum of the slope table entries divided by the number of slope table entries. The formula for updating the base is the APN network time−(client local time+½RTT)*slope.

Figure 3:
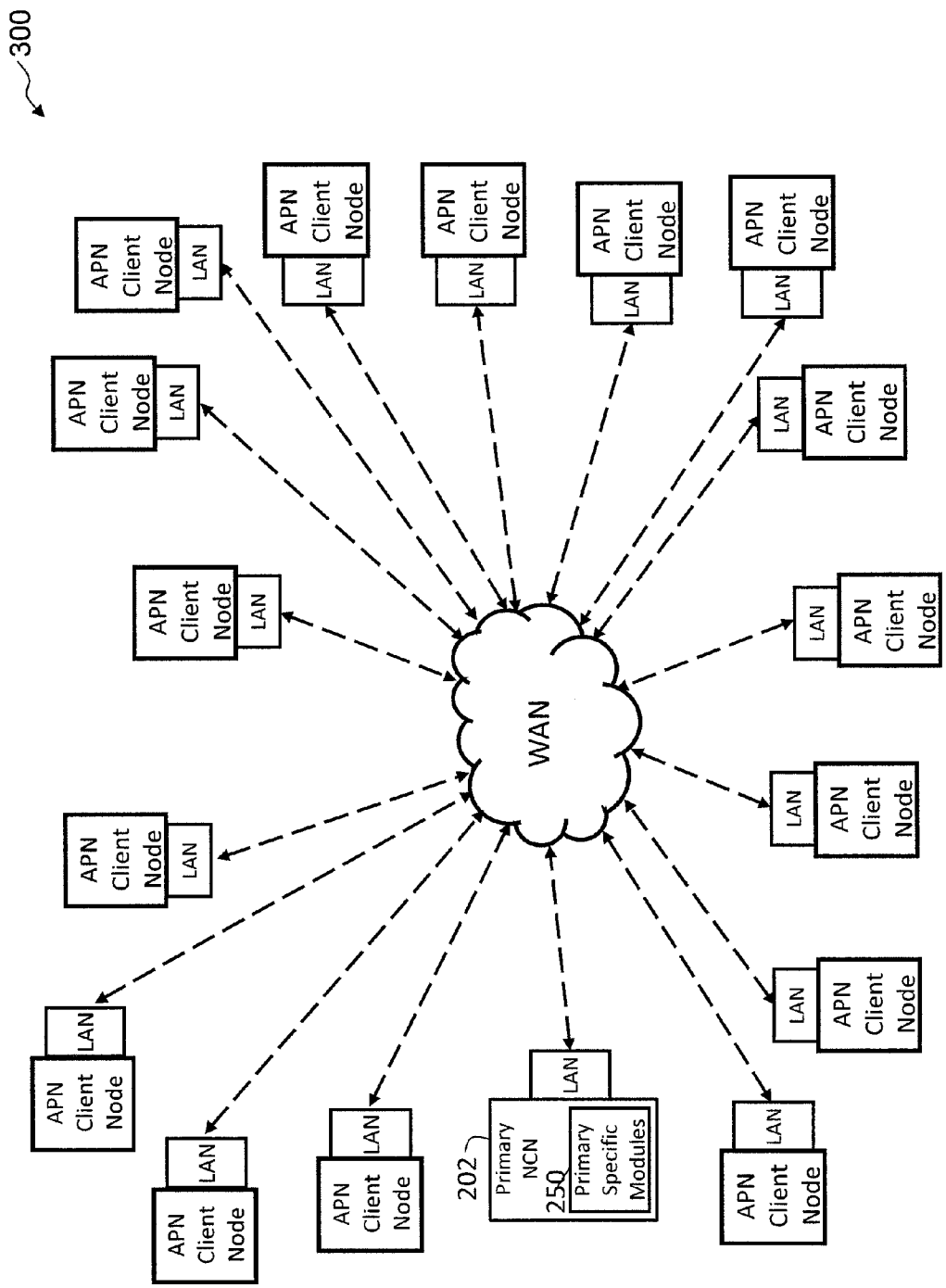
FIG. 3 illustrates a network configuration having an APN network control node (NCN) coupled through sixteen APN conduits to sixteen APN client nodes in accordance with the present invention.

FIG. 3 illustrates an APN 300 having an APN network control node (NCN) 202 coupled through sixteen APN conduits to sixteen APN client nodes according to the present invention. As illustrated in FIG. 3, in a presently preferred embodiment, APN 300 is centrally configured. A network administrator configures the entire APN 300 through an APN configuration file that is processed by the NCN module 250. The NCN module 250 then distributes the configuration settings to all client nodes in the APN 300. This method of configuring the APN 300 is intended to provide benefits to the administrator by providing a single point of configuration to the network. It also assures configuration consistency and compatibility for all APN nodes in the network simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a holistic mapping of the APN resources and their initial allocations. Furthermore, the centralized configuration can provide information and warnings to the administrator as to the behavior of the configuration that may not be obvious or intended from the configuration, before loading the configuration onto a production network.

There are currently four methods of updating the configuration of APN client nodes, such as client and secondary NCN 204. FIG. 2C illustrates APN configuration transactions 272 and 274 between an APN client and secondary NCN 204 and an APN control node 202 according to the present invention. The APN control point specific NCN module 250 may perform APN configuration push process 272, as described below, to initiate the sending of a new configuration. One of the APN client nodes, such as client and secondary NCN 204, may send an APN configuration version report 274 to the APN control point NCN module 250, which causes the NCN upon detecting a mismatch to initiate the transfer of the correct configuration to the client node. Alternately, a new configuration may be uploaded directly through an administrative web interface console software program residing within every APN node, shown as software interfaces 276 and 278 in FIG. 2C. Additionally, a quick start version of the configuration may be used as well.

When an APN configuration push process 272 is initiated, a message is sent from an APN master configuration server 258 to an APN client configuration agent 257 to indicate that an update is available. The APN client configuration agent 257 replies with a request for a data block of the configuration file 274 and the APN master configuration server 258 responds to the request by sending the requested data block 272 containing, for example the first 800 bytes of the configuration file to the APN client configuration agent 257. The client node issues multiple requests for file blocks in parallel, up to some predefined limit. The limit for parallel requests in progress scales up and down based on detection of loss in the network. If a preset time limit, such as 800 to 1000 milliseconds (ms), has passed and the APN master configuration server 258 has not received an ACK 274, it will retransmit the packet. This process continues until all packets have been successfully transmitted or the APN master configuration server 258 transmits a packet ten times, for example, without receiving an ACK. At this point, the transport layer of software stops any more retransmissions and a higher layer of the software takes over. For example, clients may scale down the number of parallel block requests and possibly reissue the initial request for that block.

As the APN control point NCN module 250 of FIG. 2C contains all the configuration files for the sites in the network, an update may be manually performed using these files. Through administrative interfaces, such as interfaces 276 and 278, a file or files containing all configuration registries and all software packages for each site in the APN is downloaded from the APN control point NCN module 250. The APN would distribute all client site software packages to the secondary NCN site using control messages. The APN control point NCN can also generate a specific client site configuration that can be downloaded to the client module 251 via the client administrative interface 276. The APN services on the APN client and secondary NCN 204 are then applied or restarted, depending on the type of configuration changes received, thus bringing the APN client node configuration into synchronization.

In the case of an APN configuration request 274, the control plane module 230 of the APN client and secondary NCN 204 indicates that it has received an APN quality report from the APN control point NCN module 250 with a configuration version that does not match the current configuration of the APN client and secondary NCN 204. An APN configuration request 274 is sent to the APN master configuration server 258 which will verify that it has an updated configuration for the APN client and secondary NCN 204 and initiates an APN configuration push process 272 as described above. If the APN client and secondary NCN 204 no longer exists in the new APN configuration, the APN configuration request 274 will be ignored.

In one presently preferred embodiment, APN conduits may exist between the NCN and for example sixteen APN client nodes as shown in FIG. 3, for example, although there is no systemic limit to the number of potential APN client nodes. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path. If no path is in path quality good state, then a path with the highest bandwidth path quality bad state is chosen.

Figure 4:
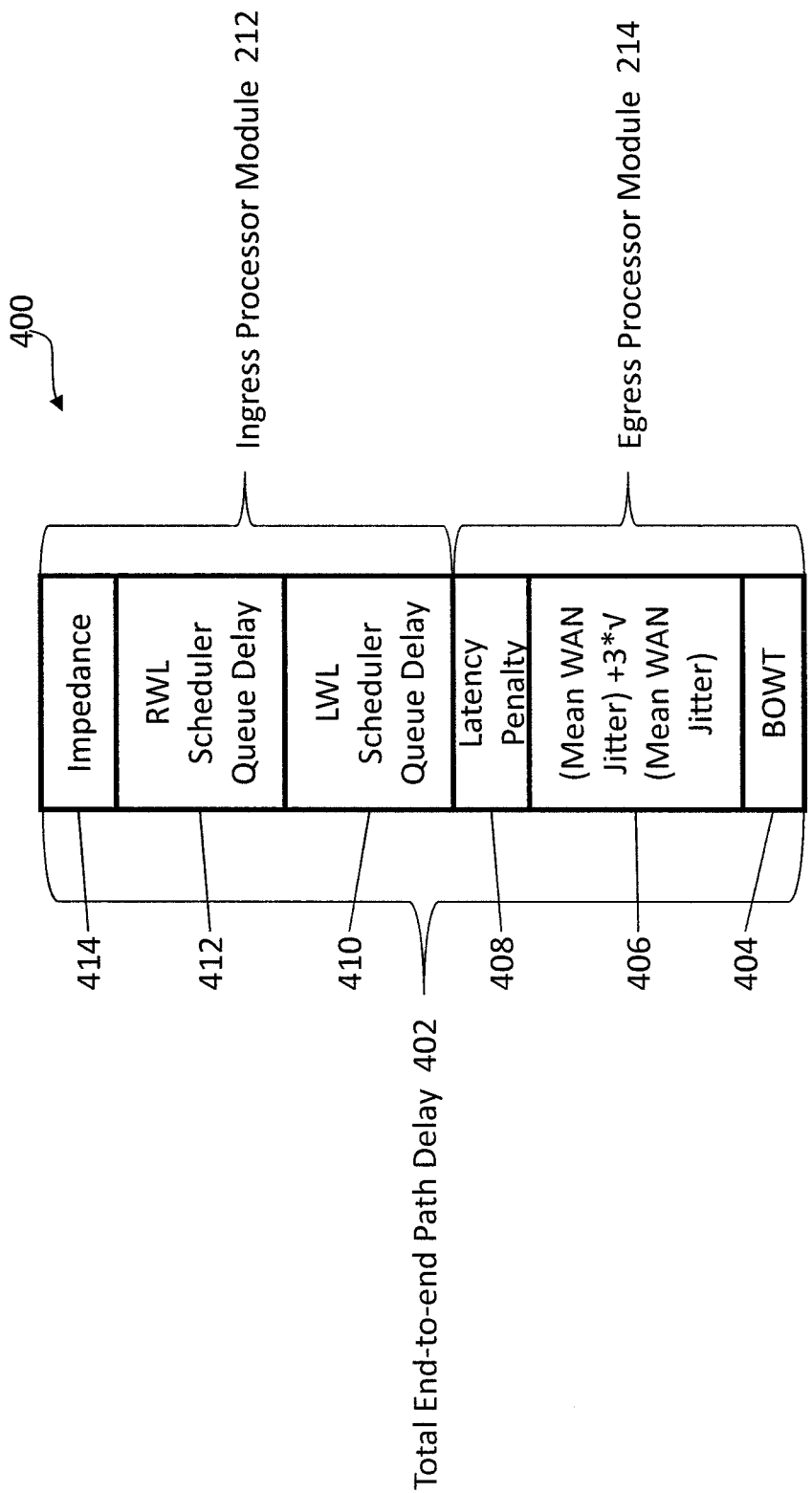
FIG. 4 is a diagrammatic representation of factors used to determine the total end-to-end path delay in accordance with the present invention.

FIG. 4 is a diagrammatic representation of factors 400 used to determine the total end-to-end path delay according to one embodiment of the present invention. Such factors determine an estimated end-to-end time in an evaluation process of a best path as compared to other alternative paths. The term "one way time" (OWT) refers to the amount of time it takes for a packet to traverse a network from source to receiver. In the context of this invention, the one way time is measured by subtracting the receive time stamp from a WAN egress module 214 from the send time stamp from a WAN ingress module 212, FIG. 2A. The term "best one way time" (BOWT) refers to the lowest measured OWT for a particular packet on a particular path over a period of time. Initially, the evaluation process chooses one best path based on path latency which is calculated using a best one way time (BOWT) 404, mean WAN jitter 406, latency penalty for short term instability 408 and WAN link scheduler's queue delay times 410 and 412, with additional preferential treatment referred to as impedance 414 applied to any prior primary path for the APN traffic flow, if a primary path exists. Thus, an exemplary formula for estimating total end-to-end path delay is the BOWT 404+(mean WAN jitter 406)+3*($\sqrt{}$(mean WAN jitter 406))+latency penalty 408+ local WAN link scheduler queue delay 410+remote WAN link scheduler queue delay 412+impedance 414. The BOWT 404, mean WAN jitter 406 and latency penalty 408 are provided by a remote APN conduit state resulting from control messaging from the egress processor module 214 of FIG. 2A, while the local WAN link scheduler queue delay 410, remote WAN link scheduler queue delay 412 and impedance 414 are provided by the WAN ingress processor module 212 of FIG. 2A.

Impedance is employed as the present invention recognizes that a typical queuing system follows a Poisson distribution. In other words, a typical queueing system has a statistical probability curve that, when plotted on a chart, is highly slanted to the left, with potentially long tail to the right. Although the probability equation to determine the ~99% path delay time is very sound, it is also important of note that any probability is not a certainty. Although sending a packet on a particular stable path will typically with ~99% certainty result in the packet arriving at or before a statistical jitter calculation, when the packet arrives before the ~99% time is much less certain. For example, if there are two paths that both have ~99% certainty of arrival at 50 ms, it is very possible that one path will be more skewed in its probability to the left with a potentially higher one way time than the other path. If every other packet was transmitted to each of the otherwise ~99% probability equivalent paths to a remote APN node, it is highly likely that the packets would frequently arrive out of order at the remote APN node. Thus, the packet transmission would result in longer hold times and a potential loss of transmit opportunity for higher priority traffic from the sending APN node. It can be appreciated that if sets of sequenced packets are sent on the same paths, these sets have a higher likelihood of packets arriving in order at the remote APN node, resulting in much fewer instances of holding of packets for reordering. By allowing for up to 5 msec of additional queuing time per path prior to switching paths, a much more efficient end-to-end system is achieved. There still is a potential for some resequencing when the 5 msec switch over occurs, but it is understood that this would be for APN traffic flows which are exceeding a path's allocated bandwidth and have greater tolerance for the resulting delay. Various types of data traffic, such as high definition video streaming may be handled in an alternative method as an exception to the use of impedance as described above.

Using queuing theory, Poisson distribution assumptions, and a highly accurate APN wide APN clock sync that allows for accurate one way time measurement, a method is provided that is typically capable of estimating path latency and statistical jitter with an accuracy approaching ~99%. An equation which may be suitably used is best one way time (BOWT)+(Mean WAN Jitter)+3*($\sqrt{}$(mean WAN jitter)). This equation provides a very accurate inference with just a few samples of traffic over a short period.

In an APN configured for high availability with a node site configured with an active network control node and a secondary network control node. Redundancy at this site is achieved by having the secondary control node take over as the NCN if problems develop. However, this configuration provides no redundancy for the node site itself. For example, if that site were to become unavailable due to a natural disaster, due to severe network outages or some other cause, then there would be no NCN to manage the APN. In such an event, in accordance with the present invention one or more sites may serve as an NCN if a primary NCN site becomes unavailable.

Figure 5:
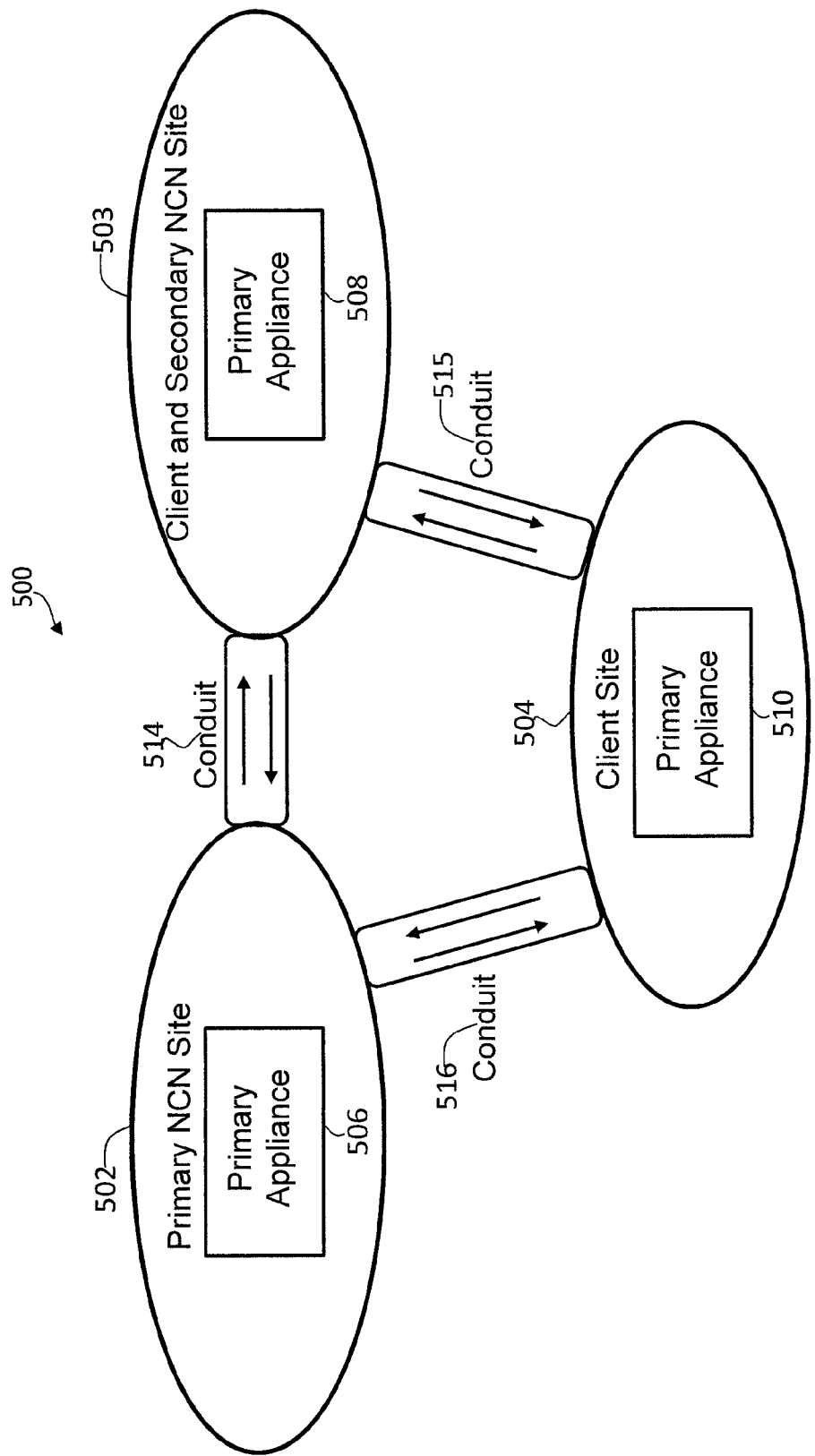
FIG. 5 is an exemplary APN with geographically diverse network control nodes (NCNs) in accordance with the present invention.

FIG. 5 is an exemplary APN 500 with geographically diverse network control nodes (GDNCNs) in accordance with the present invention. The exemplary APN 500 is configured with three sites 502-504, which are selected to be located remotely from each other. A site would be defined as remote if the devices are physically in different locations such as different buildings, cities, states, time zones or countries. For example, a primary NCN site 502 may be located in a company's headquarter location in a first country, a client and secondary NCN site 503 may be located in second country, and a client site 504 may be at some location intermediate between the two other sites. An APN appliance is a device that contains APN node functionality according to software modules, such as the control plane module 210 and 230, the WAN ingress processor module 212 and 234, and the WAN egress processor module 214 and 232, as described in more detail above with reference to FIG. 2A. The three sites 502-504 are coupled by conduits 514-516 and each of the three conduits provides a configurable virtual connection between two connected APN appliances. The exemplary APN 500 is also configured with two sites that can serve as an active NCN for the APN. It is noted that while only a single client site 504 is illustrated, an APN with geographically diverse NCNs may support as many client sites as are required for the APN and not limited by having one or more geographically diverse NCNs. The configuration of any site for high availability is optional and will be discussed in more detail with regard to FIG. 9.

The primary NCN site 502 is an APN site that is configured to be a default active NCN providing NCN functionality for the APN 500. The client and secondary NCN site 503 is an APN site that is configured to be a default secondary NCN providing capability to take over the role of the NCN as needed for the APN 500 and also operates as a client site when in standby NCN mode. With multiple sites, such as a plurality of client sites in the APN, the primary NCN site 502 and the secondary NCN site 503 are both required to have conduits to all sites in the APN. An active-secondary (A-S) conduit is a conduit between a primary NCN and a secondary NCN. Active-client (A-C) conduits are a set of conduits between an active NCN and client nodes.

Whether a secondary NCN site is triggered to start a transition process to taking over the role of an active NCN for the APN is determined by examination of a change in APN state information, such as conduit states based on a threshold. If a conduit is functioning at or above a quality communication threshold, the conduit is considered, for the purposes of determining NCN state, in a good conduit state. If the conduit is functioning below the quality communication threshold, the conduit is considered, for the purposes of determining the NCN state, in a bad conduit state effectively turning the conduit off. It is noted that even if two or more NCNs became active NCNs, there would be no network outage since no resource is shared between two active NCN sites. The configuration information for the APN, such as APN 500, is separately stored in both the primary NCN site and the secondary NCN site. The network can become physically separated and operate as two separate networks in this mode until the problem is repaired or the two separate networks are reconfigured back to a single APN with the primary NCN in control.

The APN 500 distinguishes between a primary NCN site, such as site 502, and a secondary NCN site, such as site 503.

The APN 500 is configured with the primary NCN site 502 to always be the preferred active NCN for client nodes. The secondary NCN site 503 transitions to active NCN functionality upon detecting the change in APN state information, such as the conduit 514 to the primary NCN site 502 is down. Client site 504 may still treat the primary NCN site 502 as the active NCN if the conduit 516 to the primary NCN site 502 is up. Client site 504 treats the secondary NCN as the active NCN if the conduit 516 to the primary NCN site 502 is down and the conduit 515 to the secondary NCN site 503 is up and receiving control messages from the NCNs. The active NCN, whether it is functioning on the primary NCN site 502 or on the secondary NCN site 503, provides interfaces to the client site 504 in the same way shown in FIGS. 2B and 2C.

The active NCN keeps the network time for the APN and distributes timing information to remote sites for periodic calibration tuning of timing at the remote sites, as described in more detail above with regard to FIG. 2B. The active NCN also monitors remote sites for having the latest software and registry versions and corrects any mismatches identified. When a different APN configuration is transferred to the active NCN, the secondary NCN is synchronized to the new configuration. A secondary NCN is configured to perform all functions of a client node for normal data transfer operations.

Client appliances, such as primary appliance 510, are configured to determine which NCN is the active NCN based on the state of the conduits 516 and 515 to the primary and secondary NCN sites, respectively. If a conduit 516 to the primary NCN site 502 is available for at least a preset time period, such as five minutes, the client site 504 selects the primary NCN site 502 as having the active NCN. In this case, the client site 504 selects the secondary NCN site 503 as having the standby NCN function even though the secondary NCN site 503 may also be configured as having an active NCN or to operate as a client site. In the case where the conduit 516 to the primary NCN site is not available for at least a preset time period, such as five minutes, the client site 504 selects the secondary NCN site 503 as having the active NCN. Client sites generally ignore NCN to client control messages that originate from a standby NCN site. During APN operation, if a version mismatch of software or a new APN configuration is determined at the primary NCN or at the secondary NCN, the site with the more current or latest software or the latest configuration is considered the active NCN.

In one example scenario of a disaster situation that takes down the primary NCN site 502, the secondary NCN site 503 takes over as the active NCN for the APN 500 while the primary NCN site 502 is down. Such a situation may occur, if the secondary NCN site 503 determines the conduit 514 is inoperative for a programmed time period, such as fifteen seconds. With the primary NCN site 502 or conduit 514 down, the secondary NCN site 503 switches to become the active NCN for the APN. While operating with the secondary NCN site 503 as the active NCN, software updates and network configuration changes may be completed which would most likely change the configuration information stored in the active NCN, which in this case is the secondary NCN site 503. After the primary NCN site 502 is restored, the primary NCN site 502 must be updated with the configuration and software change information from the secondary NCN site 503. The restored primary NCN site 502 checks with the currently active NCN operating on the secondary NCN site 503 and determines there is a mismatch with the software version and that the configuration of the APN has been updated. The primary NCN site 502 yields control to the secondary NCN site 503 and the primary NCN site 502 operates as the standby NCN. With the primary NCN site 502 in standby mode, the secondary NCN is configured to push the updated configuration and software updates to the primary NCN site 502. Once the restored primary NCN site 502 has the current configuration and latest software version, the primary NCN site 502 switches from standby mode to active mode and the secondary NCN site 503 switches from active mode to standby mode. A timer mechanism, as described in more detail below, ensures the transitions occur safely. Once the primary NCN has been updated, it will take over operation after being active for a preset period of time, such as 5 minutes. It is noted that the act of changing the location of the active NCN does not impact communication traffic in the APN because the configuration information for the APN remains the same in both the primary NCN site 502 and the secondary NCN site 503 at the time of the transition and the active NCN does not interfere with communication traffic due to a change in the active NCN site.

Figure 6:
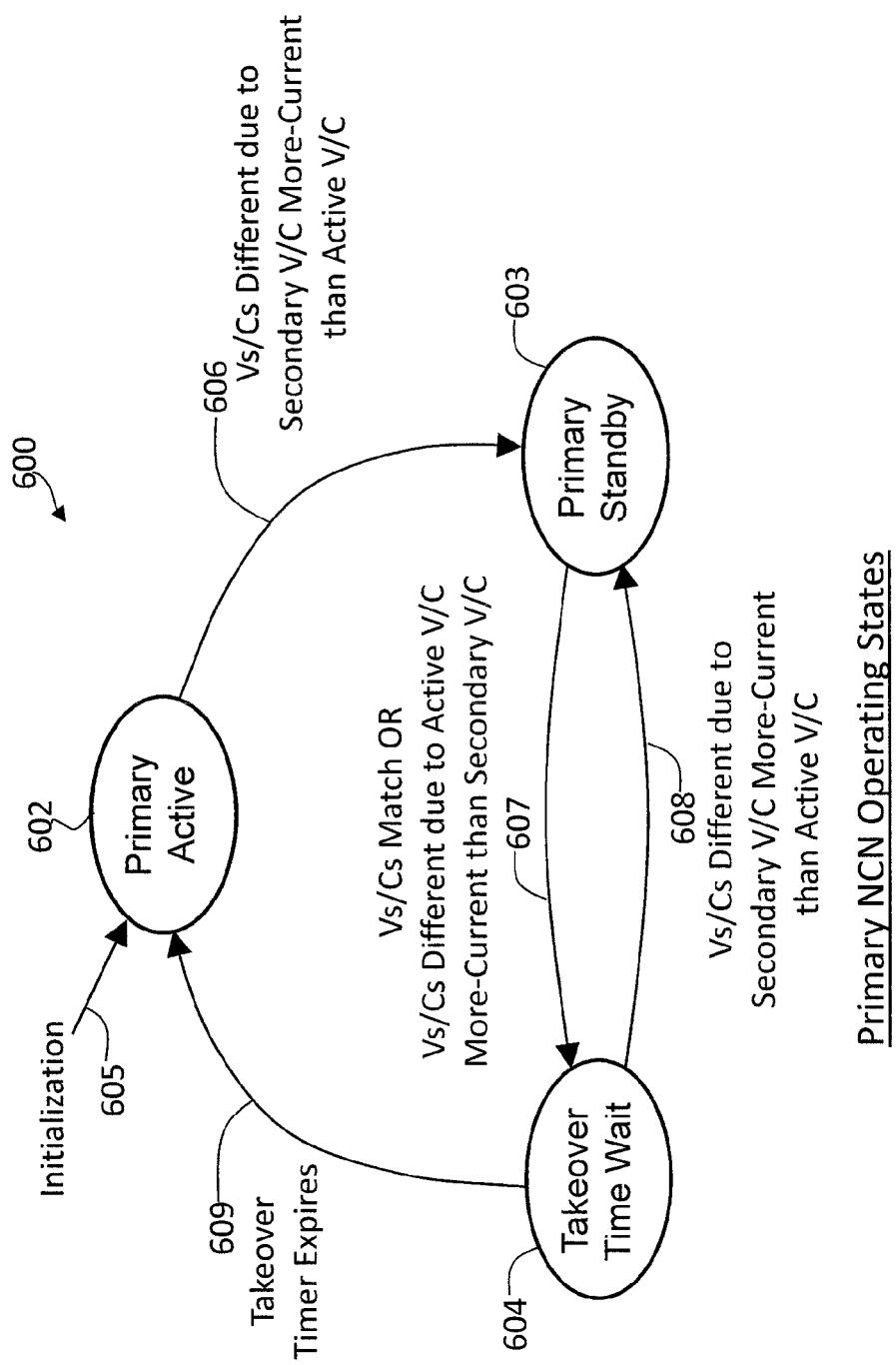
FIG. 6 is a primary NCN state machine in accordance with the present invention.

FIG. 6 is a primary NCN state machine 600 in accordance with one aspect of the present invention. The primary NCN state machine 600 operates at predetermined intervals, such as every second, to check the APN system for any events, such as a change in APN state information, that require an action to be taken. State machines of the present invention are preferably implemented in processor code with states stored in memory of the processor, though in an alternative implementation the state machines may be implemented by a circuit with feedback to and under control of a processor. The primary NCN state machine 600 is comprised of three states 602-604 and transitions 605-609 between the states. An initialization event 605 places the primary NCN site in the primary active state 602. Initialization events may include power on of the primary NCN site or a restart operation, such as may occur during software updating. If the secondary site is determined to have a software version or an APN configuration that is more current than the software and configuration information on the primary site, the state machine 600 takes transition 606 to place the primary NCN site in the primary standby state 603. At this point, either a software version, a configuration, or both are updated on the out-of-date primary NCN site. For example, while in the primary standby state 603, the software version on the primary NCN site is updated, but the new version that was installed still doesn't match the software version on the secondary site. This is usually the case when the newly installed software becomes the most current version and now the software version on the secondary site is out of date. In this scenario, the state machine 600 takes transition 607 from primary standby state 603 to takeover time wait state 604. At the takeover time wait state 604, a takeover timer is started, which is set for a predetermined period, such as five minutes. During this waiting period, an update to the secondary NCN site 503 is installed and it may be at a more current level than what was installed in the primary NCN site causing the state machine 600 to take transition 608 back to the primary standby state 603. Once the software and configuration information are determined to be at the most current level, the state machine 600 takes transition 607 back to the takeover time wait state 604 and the takeover timer is restarted. After the takeover timer expires, the state machine 600 takes transition 609 back to the primary active state 602 and the primary NCN site 502 is back operating as the APN's active NCN. The predetermined wait time, such as the exemplary 5 minute wait time, is used to be sure the primary NCN site 502 is stable. While the primary site 502 is in the takeover time wait state 604, the secondary site is still in a secondary active NCN state and in charge of APN operations.

Figure 7:
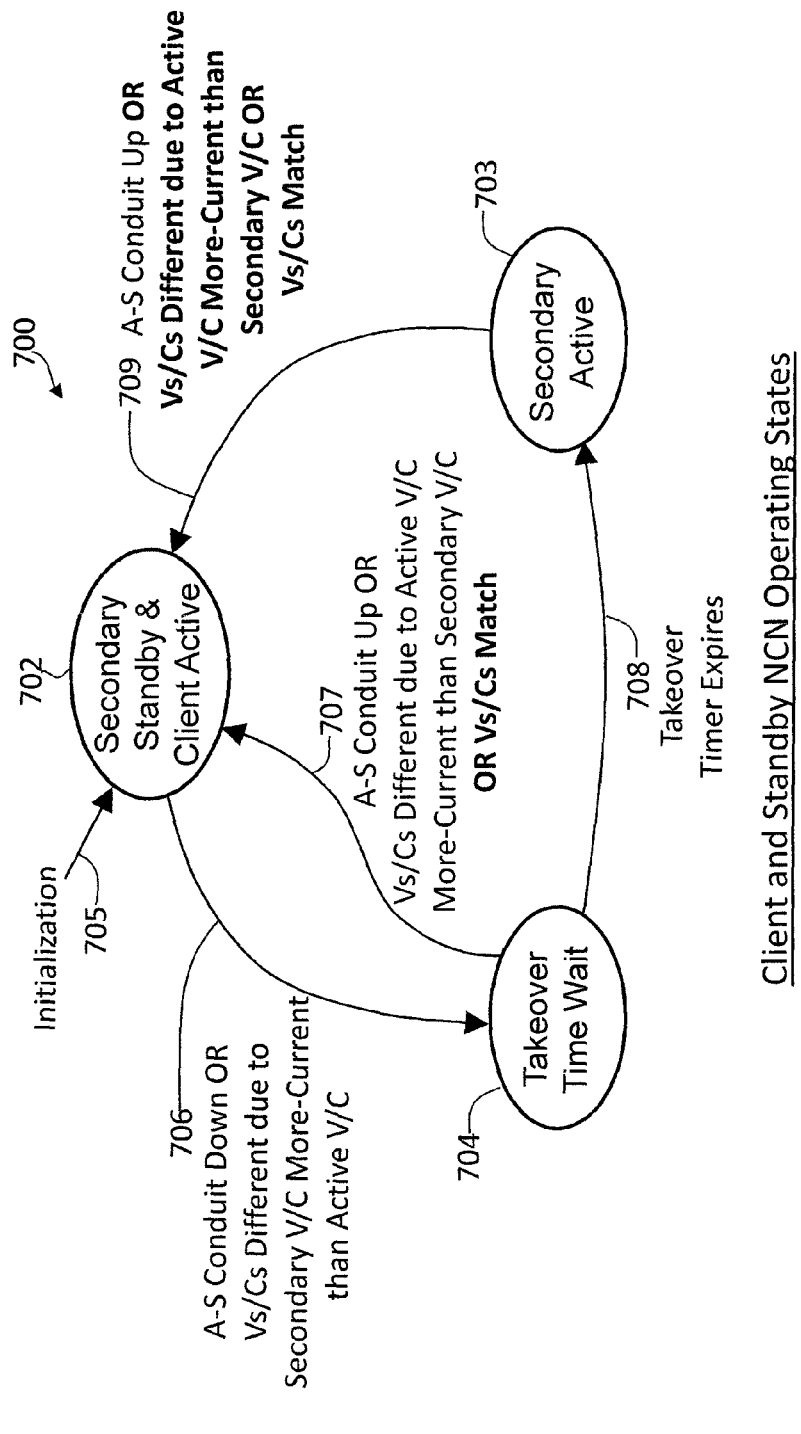
FIG. 7 is a secondary NCN state machine in accordance with the present invention.

FIG. 7 is a secondary NCN state machine 700 in accordance with the present invention. The secondary NCN state machine 700 operates at predetermined intervals, such as every second, to check the APN system for any events, such as a change in APN state information, that require action to be taken. The secondary NCN state machine 700 is comprised of three states 702-704 and transitions 705-709 between states. An initialization event 705 places the secondary NCN site in the secondary standby state 702. Initialization events may include power on of the secondary NCN site or a restart operation, such as may occur during software updating. If an A-S conduit, such as conduit 514 of FIG. 5, is down or if the secondary site is determined to have a software version or an APN configuration that is more current than the software and configuration information on the primary site, the state machine 700 takes transition 706 to the takeover time wait state 704. A takeover timer may be set to a first predetermined time, such as fifteen seconds if the transition 706 was due to determining the A-S conduit is down or may be set to a second predetermined time, such a five minutes if the transition 706 was due to determining the software versions or configuration information is more current on the secondary NCN site. It is noted that the first predetermined time and the second predetermined time are not related and set according to the particular requirements of the associated APN. While in the takeover time wait state 704, if the A-S conduit is determined to be back up or it is detected that the primary NCN site has upgraded the software and or configuration information to be at the most current level or matches the software and configuration on the secondary NCN site, the state machine 700 takes transition 707 back to the secondary standby state 702. Returning to state 704, if the secondary NCN site detects that a takeover timer has expired, the state machine 700 takes transition 708 to the secondary active state 703. At secondary active state 703, if the A-S conduit is determined to be back up or it is detected that the primary NCN site has upgraded the software and or configuration information to be at the most current level or matches the software and configuration on the secondary NCN site, the state machine 700 takes transition 709 back to secondary standby state 702.

Figure 8:
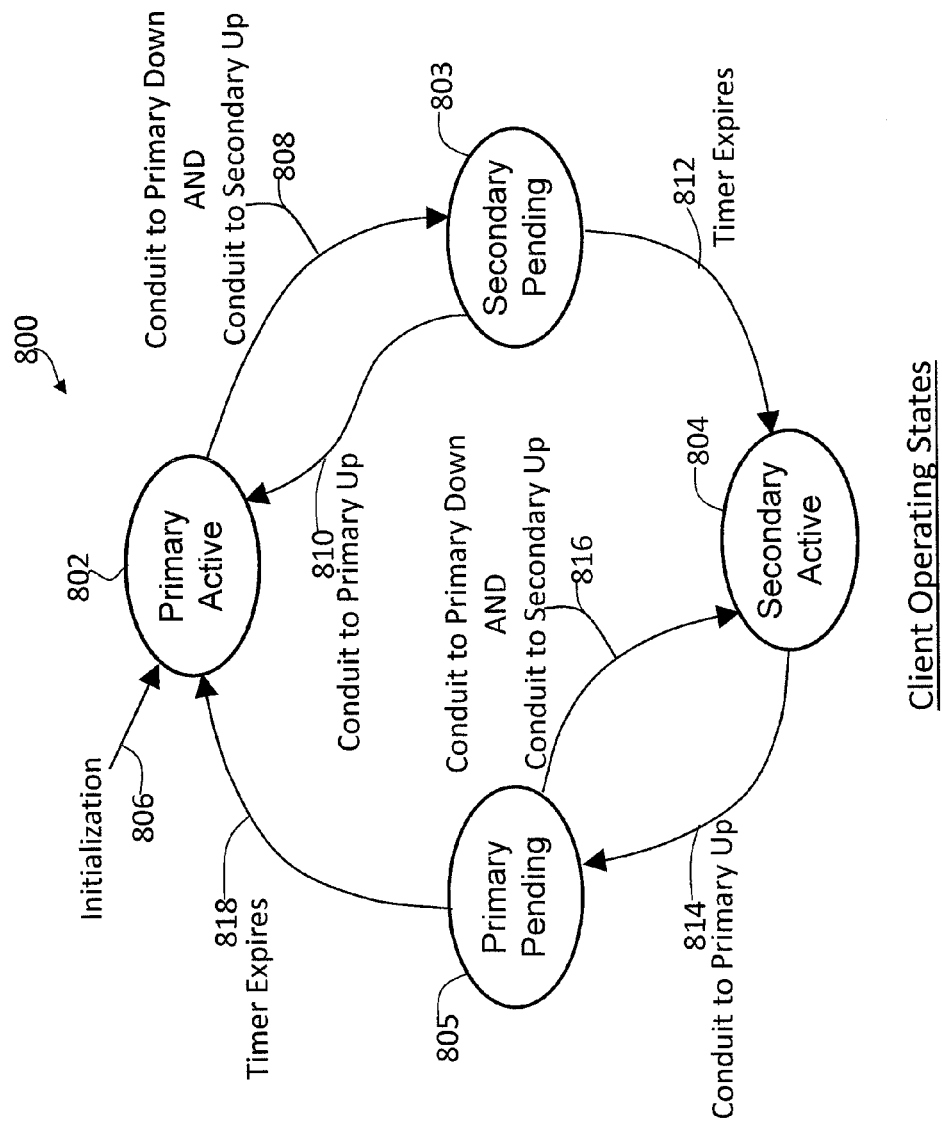
FIG. 8 is a client state machine in accordance with the present invention.

FIG. 8 is a client state machine 800 in accordance with the present invention. The client state machine 800 operates at predetermined intervals, such as every second, to check the APN system for any event that requires an action to be taken. The client state machine 800 comprises four states 802-805 and transitions between the states. States of the conduits to the primary NCN site, such as conduit 516, and the secondary NCN site, such as conduit 515, are monitored to determine which of the two sites is the active NCN. An initialization event 806 places the client site in a primary active state which represents that the primary NCN site is the active APN NCN. Initialization events may include power on of the client site or a restart, such as a restart due to a software upgrade. If the client site detects that the conduit to the primary is down and the conduit to the secondary is up, the state machine 800 takes transition 808 to a secondary pending state 803 and a takeover timer is started. Prior to the takeover timer expiring, if the client site determines the conduit to the primary NCN site is back up, the state machine 800 takes transition 810 back to the primary active state 802. Returning to the secondary pending state 803, if the takeover timer expires, the state machine 800 takes transition 812 to a secondary active state 804, which represents that the secondary NCN site is the active APN NCN. If the client site determines the conduit to the primary NCN site is back up, the state machine 800 takes transition 814 to a primary pending state 805 and a second takeover timer is started. Two timers are utilized, but generally only one is active. For example, the primary to secondary timer may be set as the 15 second timer whereas the secondary to primary timer may be set as the 5 minute timer. Prior to the second takeover time expiring, if the client site determines the conduit to the primary is back down and the conduit to the secondary is still up, the state machine 800 takes transition 816 back to the secondary active state 804. Returning to the primary pending state 805, if the second takeover time expires, the state machine 800 takes transition 818 back to the primary active state 802, which represents that the primary NCN site is back to being the active APN NCN.

It is noted that whenever an APN appliance changes from active NCN to standby NCN or standby NCN to active NCN, the APN appliance is required to reinitialize its time synchronization. Such time synchronization is accomplished in the manner described with regard to FIG. 2B. Any time synchronization control messages received during the time synchronization period may not be valid and are dropped. In such a situation with a transition of the secondary NCN site making a transition to the active state, the secondary NCN reestablishes the network time using its own local clock and messages may be retransmitted. It should be noted that the control and WAN ingress and egress processor modules can operate independently. Time control messages can be dropped while packets continue to flow during time synchronization.

Figure 9:
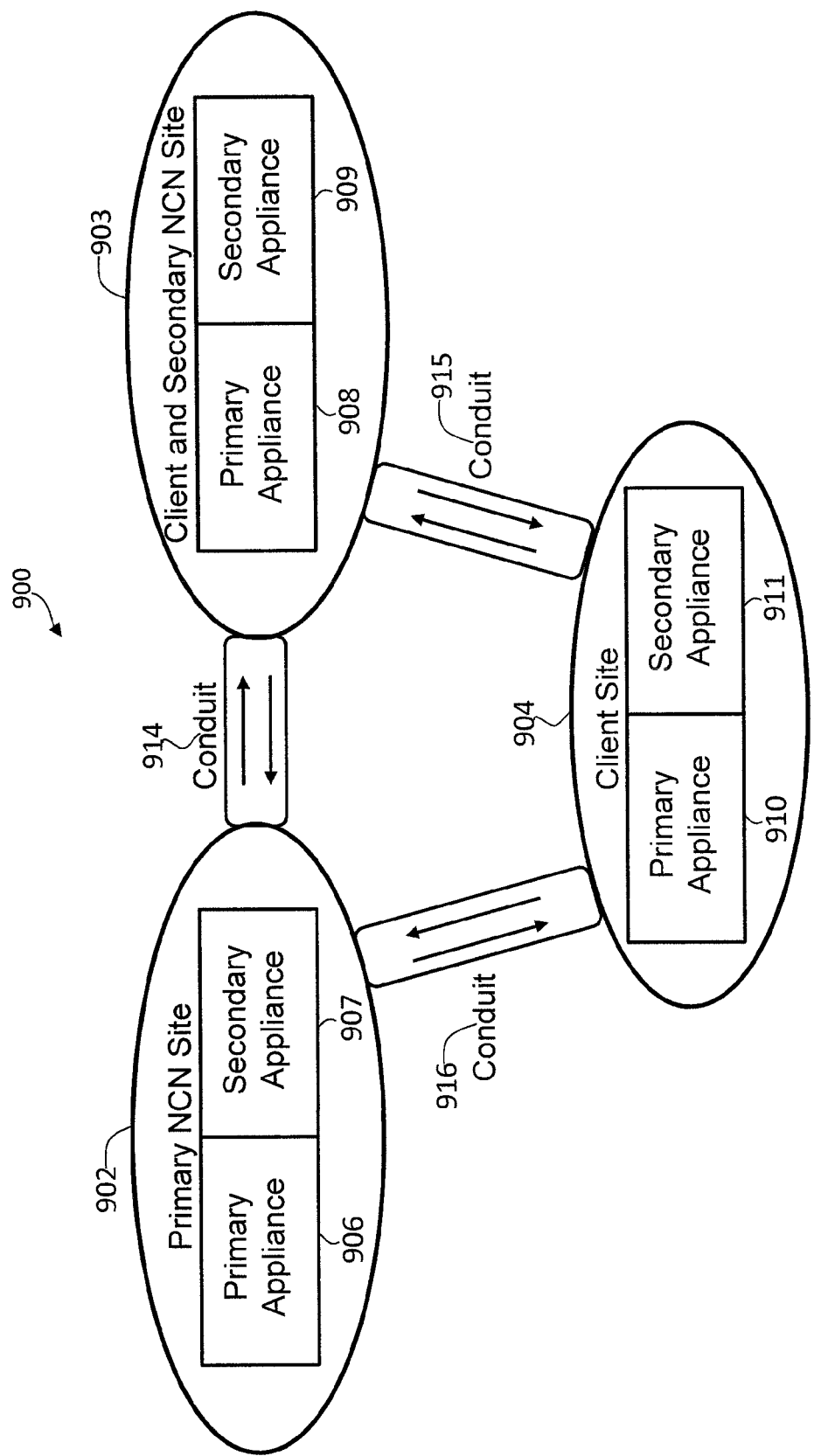
FIG. 9 is an exemplary high availability APN with geographically diverse network control nodes (NCNs)

FIG. 9 illustrates an exemplary high availability APN 900 with geographically diverse network control nodes (NCNs). Each site 902-904 is organized in a high availability configuration with a primary appliance 906, 908, and 910 and a secondary appliance 907, 909, and 911, respectively. The high availability APN 900 provides reliable operation at a node site even with a failure of a primary appliance. Both the primary NCN site 902 and the client and secondary NCN site 903 synchronize updates to configuration and code libraries with any high availability pairs of appliances, such as primary appliances 906, 908, and 910 and secondary appliances 907, 909, and 911. The communication between NCN sites utilizes the same communication protocol utilized for communications between any two nodes as in the APN 500 and does not require any additional messages or change in any fields in a message to support high availability operations between sites. If the primary NCN site 902 has a failure and the APN 900 switches to the secondary NCN site 903, the primary appliance 908 takes over the NCN role. If the primary appliance 908 also has a failure, the active NCN operations switch to the secondary appliance 909.

The current invention as described provides for three levels of failure protection. If the primary appliance 906 fails, the secondary appliance 907 would take over as the active NCN (level 1). If the secondary appliance 907 then fails, the client and secondary NCN site 903, primary appliance 908 would take over as the active NCN (level 2). If the primary appliance 908 were to fail, the secondary appliance 909 would take over as the active NCN (level 3). Extending the current invention to support multiple secondary NCN sites could be done by modifying the state machines 600, 700 and 800 to support a priority attribute. In an event of a failure, the next highest priority secondary NCN site would take over as the active NCN. The priority attribute could be exchanged with the client site notes or could be based off the lowest IP address of each secondary NCN site node.

Figure 10A:
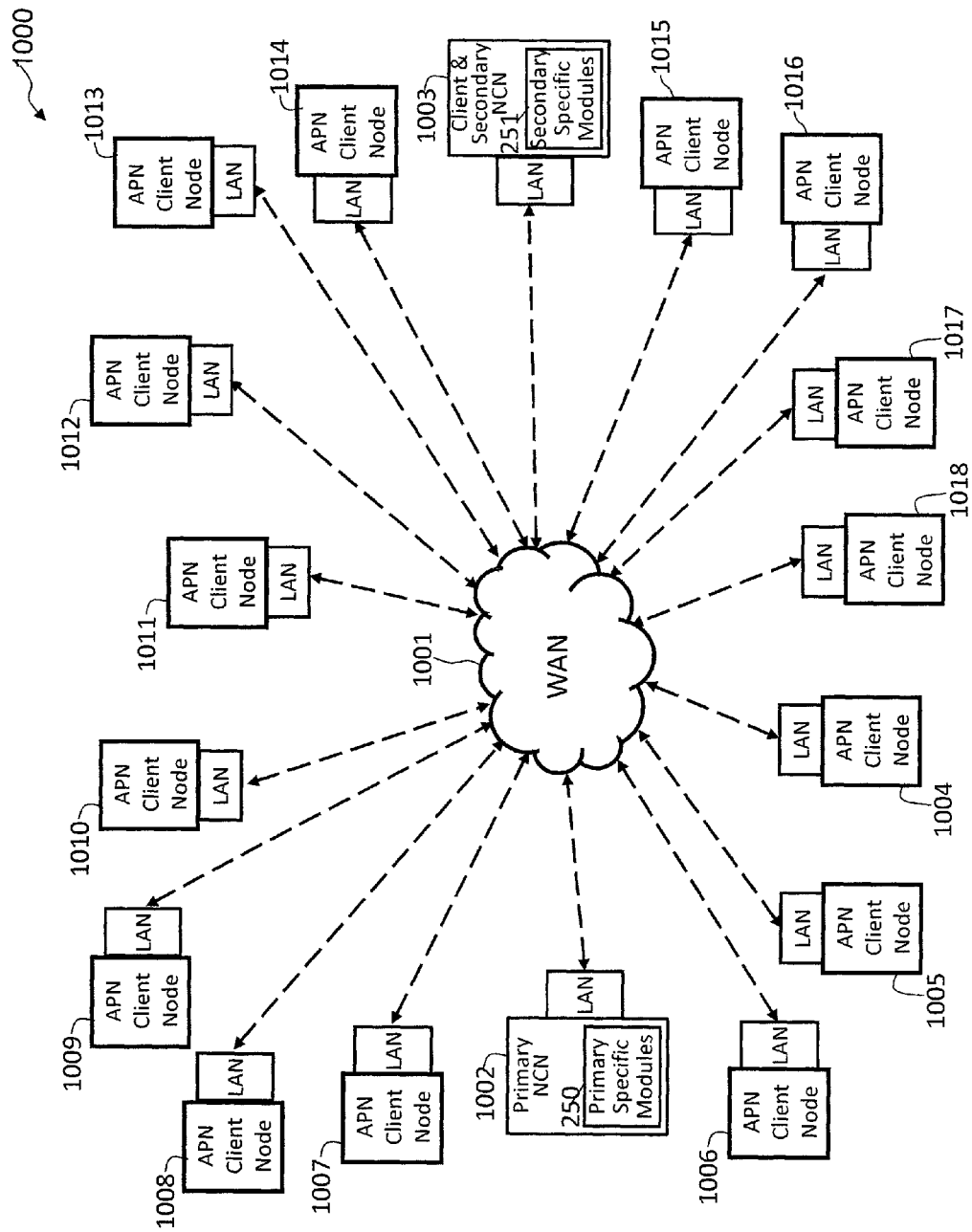
FIG. 10A illustrates an APN configuration with a primary NCN site and a client and secondary NCN site, each NCN site coupled to sixteen APN conduits to sixteen APN client nodes in accordance with the present invention.

FIG. 10A illustrates an APN 1000 configuration with a primary NCN site 1002 and a client and secondary NCN site 1003, each NCN site is coupled to sixteen APN conduits across WAN 1001 to sixteen APN client nodes 1003 and 1004-1018 in accordance with the present invention. Timing in the client nodes 1003 and 1004-1018 has been calibrated to a master clock in the primary NCN site 1002. The primary NCN state machine 600, the secondary NCN state machine 700, and the client state machine 800 are in operation at the same time. In the APN 1000, the primary NCN site 1002 is the active NCN and the client and secondary NCN site 1003 is operating as a client. No failures have been detected and the APN 1000 is operating normally.

Figure 10B:
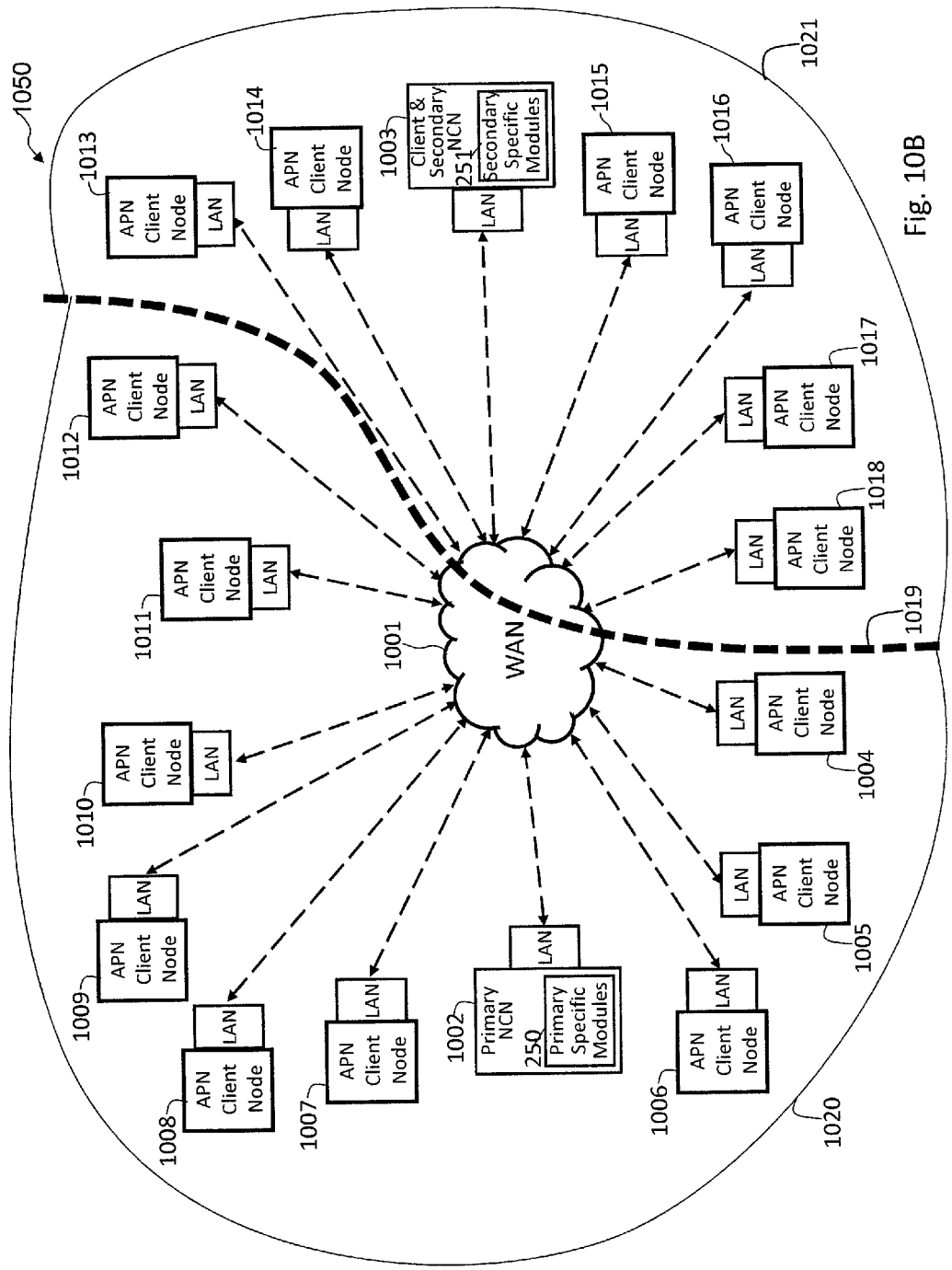
FIG. 10B illustrates an APN configuration with a primary NCN site and a client and secondary NCN site, each NCN site coupled to sixteen APN conduits across a WAN to sixteen APN client nodes after a failure in the network splits the APN, represented by a dashed line, into two separate networks in accordance with the present invention.

FIG. 10B illustrates an APN 1050 configuration with a primary NCN site 1002 and a client and secondary NCN site 1003, each NCN site is coupled to sixteen APN conduits across WAN 1001 to sixteen APN client nodes 1003 and 1004-1018 after a failure in the network splits the APN 1050, represented by a dashed line 1019, into two separate networks 1020 and 1021 in accordance with the present invention. For example, a disaster could remove all connectivity between a primary and secondary NCN as illustrated by the dashed line 1019. In the primary NCN site 1002, the state machine 600 stays in state 602 and identifies that due to an event the number of client nodes has changed and only the nodes 1004-1012 represented by the split APN 1020 are still present. In the client and secondary NCN site 1003, the secondary NCN state machine 700 identifies that due to the failure the conduit to the primary NCN has failed. In response to the failure, the secondary NCN state machine 700 takes transition 706 to takeover time wait state 704 and after the takeover timer expires takes transition 708 to secondary active state 703. In the secondary active state 703, the client and secondary site 1003 becomes the active APN NCN for the second split APN 1021 with client nodes 1013-1018. In this failed mode, the first split APN 1020 and the second split APN 1021 operate and can be rejoined once connectivity has been returned between the two split networks. When the split APN 1020 and APN 1021 are rejoined, any code or configuration changes will be automatically synchronized.

The state machines 600, 700, and 800 are configured to also take into account typical administrative tasks required by a network operator and or equipment being managed. Such administrative tasks are not treated as failure events. For example, configuration changes on an appliance or node do not falsely activate failover operation from a primary active NCN to a secondary NCN or put the APN system in a constant state of thrashing between primary and secondary nodes. Changes between local node primary and secondary appliance configurations as identified in 900 also do not falsely activate a failover operation. Such thrashing between primary and secondary NCN nodes is avoided by use of the timers described above which provides time for operations at the primary and secondary nodes and at the primary and secondary appliances to complete and return to a stable operating state.

Software packages for an APN are distributed and managed in a similar maner as the APN control point NCN module 250 of FIG. 2C uses to manage configuration files. Through administrative interfaces, such as interfaces 276 and 278, files containing software packages for the sites in the APN may be downloaded using interface 278 to the APN control point NCN module 250. The APN primary NCN 502 as in FIG. 5 will distribute all client site software packages to the secondary NCN 503 site using control messages. The client sites and secondary NCN sites can also be updated locally by downloading client software packages to the client module 251 via the client administrative interface 276. The APN services on the APN client and secondary NCN 204 are then restarted thus bringing the APN software node configuration into synchronization.

While the present invention has been disclosed in the context of various aspects of presently preferred embodiments, it will be recognized that the invention may be suitably applied to other environments consistent with the claims which follow.

We claim:

1. A method to provide geographically diverse network control nodes (NCNs) in an adaptive private network (APN), the method comprising:
   operating, in a first node in a first geographic location, a primary state machine at a primary NCN active state to provide timing and control as a primary NCN for the APN;
   operating, in a second node in a second geographic location that is geographically remote from the first geographic location, a secondary state machine at a client active and secondary NCN standby state as a first client, wherein the second node transitions to a secondary NCN active state if proper operation of the APN by the primary NCN is affected, whereby NCN control of the APN switches from the first geographic location to the second geographic location; and
   operating, in a third node, a client state machine at a primary active state as a second client and that determines which APN node is a currently active NCN.

2. The method of claim 1 further comprising:
   transitioning the secondary state machine from the client active and secondary NCN standby state to a takeover time wait state in response to detecting a first change in operating information; and
   transitioning the secondary state machine from the takeover time wait state to the secondary NCN active state in response to detecting a second change in operating information, the second node as a secondary NCN provides timing calibration and control to the APN client nodes.

3. The method of claim 2, wherein the first change in operating information includes information that a conduit is in a down state between the first node and the second node and the second change in operating information is that a takeover timer set to a first period of time has expired, the first period of time set to allow time for the conduit to have stabilized in the down state.

4. The method of claim 2, wherein the first change in operating information includes information that a software version in the second node is more current than a software version in the first node and the second change in operating information is that a takeover timer set to a second period of time has expired, the second period of time set to allow sufficient time for the software version in the first node to be updated.

5. The method of claim 2, wherein the first change in operating information includes information that an APN configuration in the second node is more current than an APN configuration in the first node and the second change in operating information is that a takeover timer set to a second period of time has expired, the second period of time set to allow sufficient time for the APN configuration in the first node to be updated.

6. The method of claim 2, wherein the second change in operating information that a takeover timer may be set to a first predetermined time if a conduit is in a down state between the first node and the second node or may be set to a second predetermined time, the second predetermined time greater than the first predetermined time, if the first change in operating information is in response to determining the software version or configuration information is more current on the second node compared to the first node.

7. The method of claim 2, wherein the second node in the secondary NCN active state provide timing calibration to the third node operating as the second client comprising:
   sending a plurality of timing messages from the second node to the third node in response to a timing request by the third node, wherein each timing message is tagged with a send time according to a first clock in the second node; and
   calibrating a network time in the third node based on an evaluation of a function of a ratio of an average send time versus average arrival time for the plurality of timing messages received at the third node, current time in the third node, and a round trip time between the third node and the second node.

8. The method of claim 1, wherein upon detecting a first change in operating information, the primary state machine transitions from the primary NCN active state to a primary standby state and the secondary state machine transitions from the client active and secondary NCN standby state to a secondary NCN active state to provide timing calibration and control to the APN client nodes in place of the primary NCN providing timing calibration and control.

9. The method of claim 1 further comprising:
   switching the third node from calibrating timing with the primary NCN to calibrating timing with as a secondary NCN in the second node upon the third node determining that a first conduit between the third node and the primary NCN is down while a second conduit between the third node and the secondary NCN is up.

10. The method of claim 1 further comprising:
    operating, in a fourth node of the APN in a third geographic location that is geographically remote from the first geographic location and from the second geographic location, a third state machine at a client active and third NCN standby state as a fourth client, wherein the fourth node transitions to a third NCN active state if proper operation of the APN by the primary NCN or by the secondary NCN is affected whereby NCN control of the APN switches to the third geographic location.

11. A method to provide geographically diverse network control nodes (NCNs) in an adaptive private network (APN), the method comprising:
    operating, in a first node in a first geographic location, a primary state machine at a primary NCN active state as a primary NCN for the APN;
    operating, in a second node in a second geographic location that is geographically remote from the first geographic location, a secondary state machine at a client active and secondary NCN standby state to operate as a first client;
    operating, in a third node, a third node client state machine at a primary active state to operate as a second client and that determines which APN node is a currently active NCN; and
    operating, in a fourth node, a fourth node client state machine at a primary active state to operate as a third client and that determines which APN node is the currently active NCN, wherein the first node as the primary NCN provides timing and control to the first client, the second client, and the third client in their respective nodes and upon a determination that connectivity between the first node and the second node and between the first node and the third node has been lost, the primary NCN provides timing and control to the third client in the fourth node and the second node transitions to a secondary NCN active state to provide timing and control to the second client in the third node.

12. The method of claim 11, wherein the primary state machine in the first node remains in the primary NCN active state as the primary NCN for the third client in the fourth node.

13. The method of claim 11 further comprising:
transitioning the secondary state machine from the client active and secondary NCN standby state to a takeover time wait state in response to the determination that connectivity between the first node and the second node has been lost and starting a takeover timer that was preset for a first time period; and
transitioning the secondary state machine from the takeover time wait state to a secondary NCN active state in response to the takeover timer indicating completion of the first time period, the second node as a secondary NCN provides timing calibration and control to the APN client nodes.

14. The method of claim 11, wherein the fourth node client state machine remains in the primary active state supporting the primary NCN for providing the timing and control to the third client in the fourth node.

15. The method of claim 11 further comprising:
transitioning the third node client state machine from the primary active state to a secondary pending state in response to the determination that connectivity between the first node and the third node has been lost and starting a second timer that was preset for a second time period; and
transitioning the secondary state machine from the secondary pending state to a secondary active state in response to the second timer indicating completion of the second time period, the third node requesting timing calibration by the secondary NCN.

16. The method of claim 11, wherein operating the secondary NCN further comprises:
determining the APN state by taking into account state of conduits in the APN, wherein a good conduit state is based on exceeding a quality communication threshold.

17. A method to provide geographically diverse network control nodes (NCNs) in an adaptive private network (APN) of client nodes, the method comprising:
operating, in a first node in a first geographic location, a primary state machine at a primary NCN active state to provide timing and control as a primary NCN for the APN client nodes, wherein the first node is configured with a first high availability (HA) appliance and a second HA appliance;
operating, in a second node in a second geographic location that is geographically remote from the first geographic location, a secondary state machine at a secondary NCN standby and client active state to operate as a first client, wherein the second node transitions to a secondary NCN active state if the first appliance and the second appliance in the first node fail whereby NCN control of the APN switches from the first geographic location to the second geographic location, wherein the second node is configured with a third HA appliance and a fourth HA appliance; and
operating, in a third node, a client state machine at a primary active state to operate as a second client and that determines which APN node is a currently active NCN.

18. The method of claim 17, wherein the primary NCN in the first node operates on the first HA appliance and the primary NCN transfers its operations from the first HA appliance to the second HA appliance on detection of a failure in the first HA appliance.

19. The method of claim 17, wherein the secondary NCN in the second node operates on the third HA appliance and the secondary NCN transfers its operations from the third HA appliance to the fourth HA appliance on detection of a failure in the third HA appliance.

20. The method of claim 17, wherein for a high availability system, client nodes are configured with a first HA client appliance and a second HA client appliance, wherein client operations are transferred from the first HA client appliance to the second HA client appliance on detection of a failure in the first HA client appliance.

* * * * *